May 26, 1942. A. DEKOME 2,283,918
METHOD OF MAKING BUSHINGS
Filed May 2, 1940 2 Sheets-Sheet 1

INVENTOR.
ARTHUR DEKOME
BY
ATTORNEYS.

May 26, 1942.  A. DEKOME  2,283,918
METHOD OF MAKING BUSHINGS
Filed May 2, 1940  2 Sheets—Sheet 2

INVENTOR.
ARTHUR DEKOME
BY
ATTORNEYS.

Patented May 26, 1942

2,283,918

UNITED STATES PATENT OFFICE 2,283,918

METHOD OF MAKING BUSHINGS

Arthur Dekome, Cleveland, Ohio, assignor to The Cleveland Graphite Bronze Company, Cleveland, Ohio, a corporation of Ohio Application May 2, 1940, Serial No. 333,015

4 Claims. (Cl. 29—149.5)

The present invention, relating as indicated to bushings, is more particularly concerned with bushings of the type formed of rolled sheet metal and the principal objects of the invention are the provision of means for closing or locking the abutting edges of a cylindrically formed bushing in a tight and closed relationship, and a method of forming and locking these edges to secure a permanent engagement of the type stated.

Bushings formed of sheet metal are used in very great numbers and possess numerous advantages over cast cylindrical bushings but are open to the objection that the abutting edges of the bushing, when formed, are often not in contact and this sometimes makes it difficult to handle the bushings and particularly difficult to insert them readily in the housings in which they are to be used. Bushings with tightly closed butts are much easier to assemble in the housing and are also easier to handle prior to assembly, but up to the present time no consistent method of securing a tight closed butt has been found.

In prior methods of making cylindrical bushings from sheet metal blanks, the metal blank was usually formed around a mandrel into a cylindrical shape by the action of forming dies which shaped the blank to its finished dimensions. However, when the pressure was released from the dies and the bushing was slipped from the mandrel it often sprang out of shape and opened up at the abutting edges, due to the natural resiliency of the metal. In my present method of forming bushings from sheet metal blanks the bushing is formed to its finished dimension in much the same manner as formerly but when the pressure is released from the forming dies and the bushing is slipped from the mandrel the abutting edges are held tightly together and the bushing is unable to spring apart as it formerly might.

To the accomplishment of the foregoing and related ends, said invention, then, consists of the means hereinafter fully described and particularly pointed out in the claims; the annexed drawings and the following description setting forth in detail certain structure embodying the invention, such disclosed elements constituting, however, but one of various structural forms in which the principle of the invention may be used.

In said annexed drawings—

Figure 1:
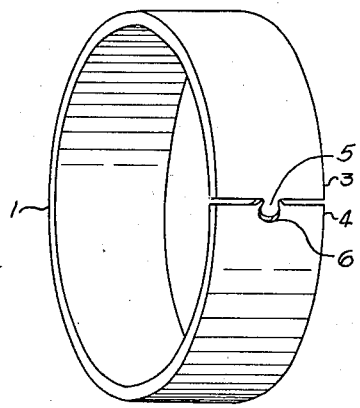
Fig. 1 is a view in perspective of a bushing prior to closing.
Figure 2:
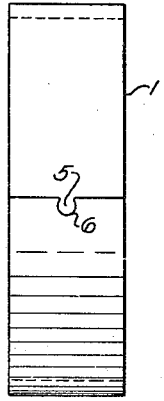
Fig. 2 is a side elevation showing the same bushing after the final butt-closing operation.

Referring to the drawings, there is shown in Fig. 1 a sheet metal bushing 1 provided with interlocking elements at the abutting edges of the strip ends 3 and 4 in the form of a tongue 5 and groove 6 to receive the same. In this figure the bushing is shown after being formed into cylindrical shape and with the tongue 5 within the groove 6, but prior to the final closing operation which produces interlocking of the tongue with the walls of the groove. The exact formation of the tongue is not of primary importance so long as the tongue and the walls of the groove are so formed as to produce an interlocking action after the final closing operation and I have shown herein two forms of my improved joint.

Figure 3:
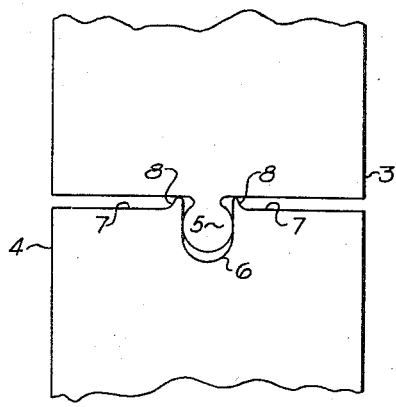
Fig. 3 is a partial side elevation showing my preferred interlocking means prior to closing.
Figure 4:
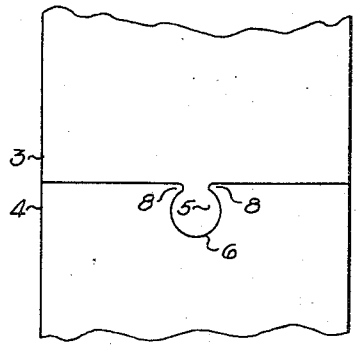
Fig. 4 is a similar view showing the same after closing.

In Figs. 3 and 4 one form of such joint is shown, in which the groove 6 in the end 4 of the bushing has ears 8 formed projecting outwardly from the surfaces 7 of the abutting edges of this end. These ears are adapted during the final forming and closing operation to be up-set into close and tight engagement with the recessed neck or portion connecting the tongue 5 with the other end 3 of the strip forming the bushing. It is this up-setting of the metal into and around the neck portion of the tongue which locks the two abutting edges of the bushing into a permanent and tight engagement.

Figure 5:
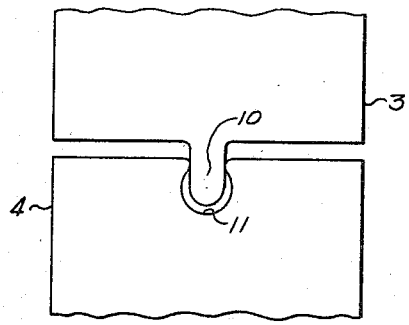
Fig. 5 is a view similar to Fig. 3 showing a second form of interlocking means.
Figure 6:
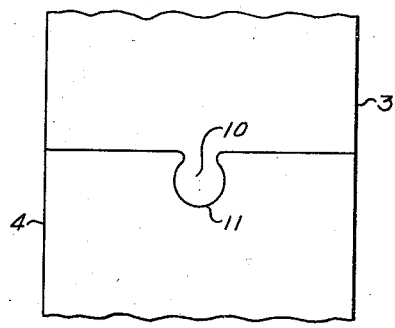
Fig. 6 is a view similar to Fig. 4 showing the interlocking means of Fig. 5 after closing.

A modification of the engagement just described in Figs. 1, 3 and 4 is illustrated in Figs. 5 and 6 in which one end of the bushing 9 is provided with a tongue 10 which, as initially formed and partially engaged with the other end of the bushing, projects into a recess or groove 11 formed in the other end 4 of the bushing strip. The tongue 10 in this case is of greater circumferential length than the depth of the groove 11 into which it is to be upset. In the final forming or closing operation, the tongue 10 is up-set, being broadened to engage within the recess 11 and produce a tight interlocking engagement which is shown in Fig. 6.

Figure 7:
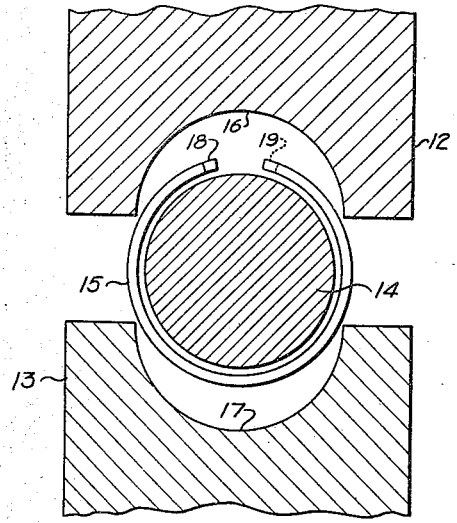
Fig. 7 is a view showing the bushing blank in the forming die prior to final forming.

In Fig. 7 is shown a bushing blank 15 with a tongue 18 and a groove 19 disposed on opposite edges and shaped into cylindrical form, placed about a mandrel 14 which has a diameter equal to the diameter required on the inside of the finished bushing. The bushing blank 15 may be formed into a rough cylindrical form prior to this operation by means of dies or by curling rolls or other means familiar in the art. The upper die 12 has a semi-cylindrical recess 16 in its face, the diameter of which is equal to the diameter required on the outside of the finished bushing. The lower die 13 also has a semi-cylindrical recess in its face, the diameter of which is equal to the diameter required on the outside of the finished bushing. In the operation of the dies the lower die 13 remains stationary while the upper die 12 descends and forces the bushing blank 15 into intimate contact with the recess 17 at the same time causing the blank to move circumferentially so that the abutting edges upon which the tongue 18 and the groove 19 are disposed will move circumferentially toward each other and the tongue 18 will slide into the groove 19. As the die continues to close, the metal of the tongue 18 will upset to fill the groove 19 since the tongue is longer than the groove as described above in reference to Figs. 5 and 7.

Figure 8:
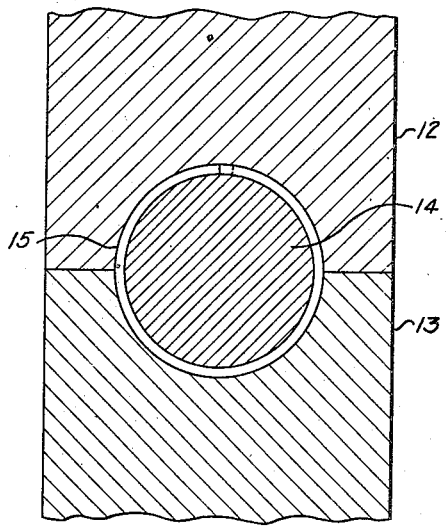
Fig. 8 is a view of the bushing in the forming die after the final forming operation.

In Fig. 8 is shown the bushing 15 in its final form disposed about the mandrel 14 and with the die members 12 and 13 in their final closed position. When the die 12 is raised and the bushing is slipped from the mandrel, it will hold the form here shown due to the fact that the abutting edges are tightly locked together by means of the tongue which is upset within the groove. A similar action takes place when the type of abutting edges shown in Figs. 3 and 4 are used.

There is a distinct advantage in forming bushings by circumferentially upsetting the interlocking means in that it fits very well into modern practice as used in the art and there are no disadvantageous strains set up in the metal of the bushing wall as would be present if other methods were used. Die costs are more economical with this type of forming and uniformity of wall thickness is held. The upsetting action holds the abutting edges firmly in place and allows the use of standard dies and tools for forming at the same time, requiring little additional stock in the bushing blank. Other methods of interlocking the abutting edges may be conceived but they would not be readily adaptable to circumferential forming.

In each of the constructions illustrated, it will be apparent that the common element in producing an interlocking engagement between the abutting ends or edges of the bushing is an upsetting of either the tongue in one case or the projecting portions of the walls of the groove or recess in the other case, to produce a material interlock between these two elements which maintains the abutting edges of the bushing in a permanent tight closed relationship.

It will be readily understood that other forms of interlocking tongues and grooves than the two illustrated may be employed but those which I have shown provide in each case an effective and permanent engagement between the strip ends when the bushing is given its final forming and setting operation. Furthermore, the two forms of tongues and grooves illustrated are easy to produce in strip ends when the latter is blanked and require little additional stock.

Other modes of applying the principle of my invention may be employed instead of the one explained, change being made as regards the structure herein disclosed, provided the means stated by any of the following claims or the equivalent of such stated means be employed.

I therefore particularly point out and distinctly claim as my invention:

1. In a method of locking the abutting edges of a cylindrically formed sheet metal bushing into a permanent engagement, the steps which consist in forming a tongue projecting from one of the abutting edges of said bushing, forming a groove oppositely disposed to said tongue in the other of said abutting edges and said groove having a shorter circumferential depth than the circumferential length of said tongue and then forcing said tongue into said groove by relative circumferential movement of the tongue and groove and upsetting said tongue into an interlocking engagement with the walls of said groove.

2. In a method of locking the abutting edges of a cylindrically formed sheet metal bushing into a permanent engagement, the steps which consist in forming a tongue projecting from one of the abutting edges of said bushing, forming a recess opposite thereto in the other of said abutting edges and providing circumferentially extending ears defining the entrance to said groove, forcing said tongue into said groove by relative circumferential movement of the tongue and groove and simultaneously upsetting said projecting ears into interlocking engagement about the tongue to produce a permanent interlocking engagement between the abutting edges of the bushing.

3. In a method of locking the abutting edges of a cylindrically formed sheet metal bushing into a permanent engagement, the steps which consist in forming a tongue projecting from one of the abutting edges of said bushing and a recess oppositely disposed thereto in the other of the abutting edges of said bushing and then forcing said tongue into said recess by relative circumferential movement of the tongue and recess and upsetting said tongue circumferentially into an interlocking engagement with the walls of said recess.

4. In a method of locking the abutting edges of a cylindrically formed sheet metal bushing into a permanent engagement, the steps which consist in forming a tongue projecting from one of the abutting edges of said bushing, forming a recess opposite thereto in the other of said abutting edges and then forcing said tongue into said recess by relative circumferential movement of the tongue and recess and causing said tongue and recess to become interlocked with each other.

ARTHUR DEKOME.